Patented Nov. 20, 1928.

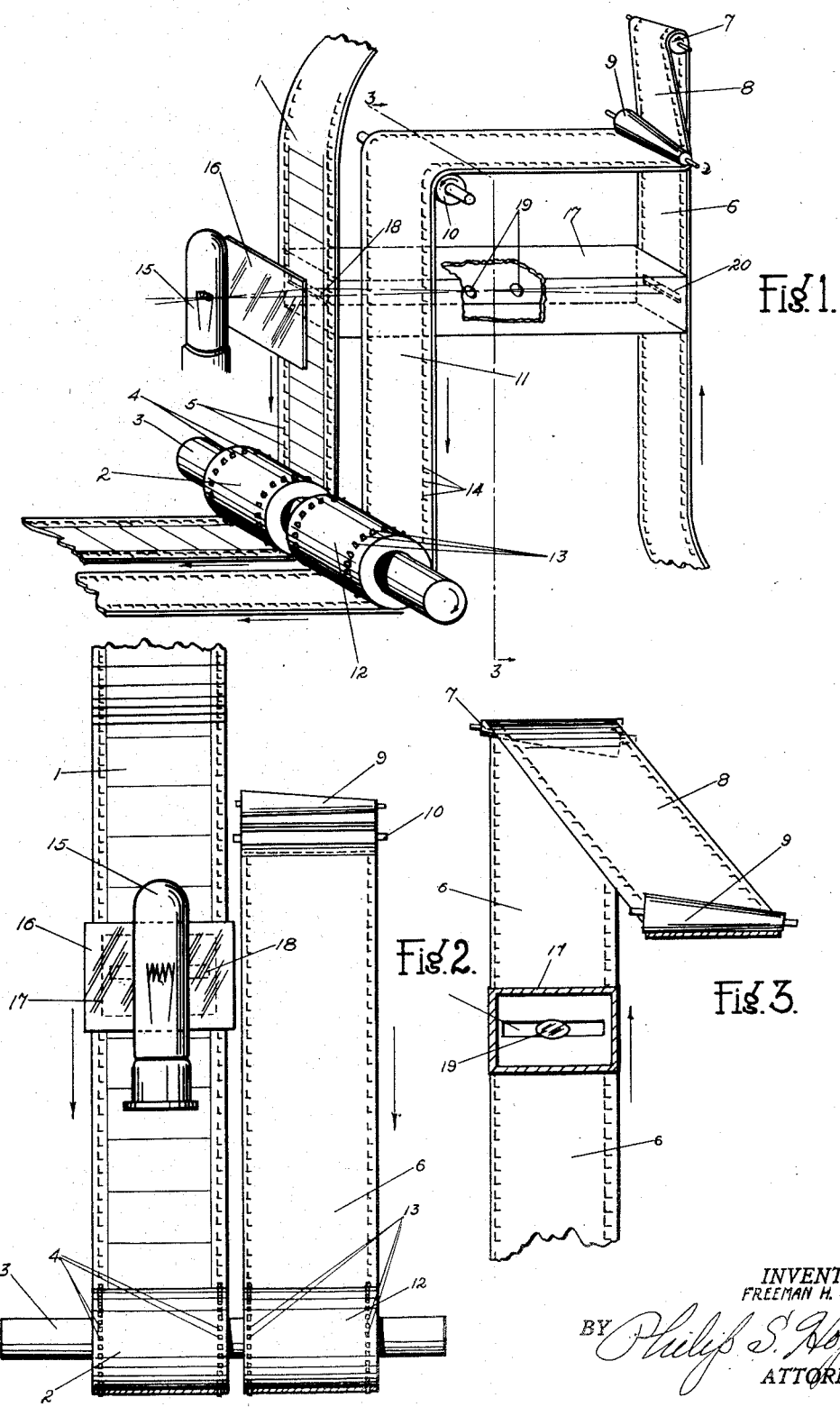

1,692,347

UNITED STATES PATENT OFFICE.

FREEMAN H. OWENS, OF NEW YORK, N. Y.

OPTICAL PRINTER.

Application filed November 12, 1926. Serial No. 147,978.

My invention relates particularly to a method and apparatus for optically printing photographic images from an exposed film on to a sensitized unexposed film. This invention has particular reference to moving picture film, which is generally reeled in long strips upon a spool or reel, and with the images or negative pictures thereon in successive relation.

The primary object of my invention is to provide a means for moving both the negative film having the images thereon, and the positive film to be printed, by means of a single shaft whereby the two films will be uniformly wound as regards the speed at which they are run. In my invention, I provide for the continuous movement of both films and have provided a novel system of rollers, by means of which the two films are properly spaced and in the same plane during the printing operation, but which are driven by a common shaft side by side, thereby insuring accuracy of travel of the films as well as greatly reducing the space necessary to accommodate such a printing apparatus.

Other objects and advantages in details of construction and operation will be apparent as the description proceeds, reference being had to the accompanying drawing wherein like reference numerals indicate like parts.

In the drawing:—

Figure 1 is a diagrammatic view in perspective, illustrating the arrangement of my improved printer.

Figure 2 is a front view of the same.

Figure 3 is a detail view taken on the line 3—3 of Figure 1.

All of these figures are schematic in character and are not intended to cover the many details incident to the construction and operation of an apparatus of this character, and all of which are old and common in the art. Such details as for instance the casing, focusing devices, power means, etc., have been purposely omitted for the sake of clearness of illustration and description.

The reference numeral 1 refers to a length of negative film which has been exposed and developed, and which contains images to be printed. This film 1 is suitably wound from any ordinary source of supply such as a reel, (not shown) downwardly and around a sprocket 2, mounted on a shaft 3. The sprocket teeth 4 engage within the perforations 5 of the film to move said film downwardly when the shaft 3 is rotated.

Spaced from the negative film 1 is a strip of positive film indicated at 6, which is fed from a suitable source of supply (not shown), and which travels in the same plane, that is, directly opposite, for a portion of its length as the negative film 1, except that it travels in the opposite direction. After traveling upwardly for a suitable distance in the same plane with the film 1, this positive film 6 turns over a tapered roller 7 and is brought downwardly a short distance as at 8, where it again turns under a second tapered roller 9, from which it is brought forward to a position directly alongside of the negative film 1, where it passes over a roller 10, and then downwardly with the negative film 1 as at 11, moving now in the same direction as the negative film, and passing over a second sprocket 12, mounted on the same shaft 3 and directly adjacent the sprocket 2. The sprocket teeth 13 engage with the perforations 14 in the positive film to cause it to move over its series of rollers. It will be noted that as the two sprockets 2 and 12 are on the same shaft, and if of the same size, the two films 1 and 6 will be moved at exactly the same rate of speed.

Suitably mounted above the shaft 3, is a light source 15 which may be suitably enclosed in any desired housing (not shown). The light from this source passes through a diffusing glass or screen 16, on to the negative film 1. This film, at a point directly opposite the light 15, passes one end of a box or casing 17, provided in its end with a slit or narrow opening 18. This slit extends across the end of the box 17 a sufficient distance to permit the images on the film, which are illuminated by the lamp 15, to be projected through the box, and through the lenses 19 suitably mounted within the box in the path of the illuminated images. A slit 20 is also provided in the opposite end of the box 17, over which runs the strip of positive film 6, as clearly illustrated in Figures 1 and 3.

It will be understood therefore, that as the films are moved past the ends of the box 17, the images on the negative strip 1 will be photographed upon the positive strip 6, and as both films are driven by the same shaft 3, the movements thereof will be uniform and of the same speed.

Obviously however, by changing the relative size of sprockets 2 and 12 and the focus of the lenses 19, different sizes of films may be run in this apparatus and the images thereof reduced or enlarged, as necessary. By this means the images of a standard sized negative could be reduced and printed in this apparatus, upon a positive film of smaller size, or vice-versa.

I wish to make it clear also that by "negative" film I refer to exposed and developed image bearing film, and by "positive" film I refer to sensitized unexposed film.

Of course, many changes may be made in details of construction and operation without departing from the spirit and scope of the invention. I do not limit myself therefore to the exact structure shown and described, other than by the appended claims.

I claim:—

1. An optical printer comprising a strip of negative film and a strip of positive film, means for moving said strips synchronously and in the same direction, means for causing a portion of the length of said positive strip to move in the opposite direction at a point spaced from and opposite to said negative film, and means for projecting images from said negative film to said positive film at such point.

2. An optical printer comprising a single shaft, sprockets on said shaft, strips of negative and positive film movable by said sprockets in the same direction, tapered rollers over which said positive film passes carrying the same to a point spaced from and opposite to said negative film and in the opposite direction therefrom, and means at such point for projecting images from said negative film to said positive film.

3. An optical printer comprising synchronously moving strips of negative and positive film, means for moving said strips in the same direction and along side each other at one point of travel and means for causing the movement of said strips to be in opposite directions, spaced apart and oppositely disposed at another point of travel, and optical means for projecting images from said negative strip to said positive strip at such latter point.

4. An optical printer comprising a rotatable shaft, two sprockets thereon, a strip of negative film moved by one of said sprockets, a strip of positive film spaced from said negative film and disposed opposite thereto, optical means for projecting images from said negative film to said positive film, said positive film being passed over tapered rollers after exposure and brought to said second sprocket and moved thereby.

5. An optical printer comprising a rotatable shaft, two sprockets thereon, a strip of negative film moved by one of said sprockets, a strip of positive film spaced from said negative film and disposed opposite thereto, optical means for projecting images from said negative film to said positive film, said positive film being passed over tapered rollers after exposure and brought to said second sprocket and moved thereby, the movement of the two film strips at the point of exposure being in opposite directions and at the sprockets in the same direction.

6. An optical printer comprising a rotatable shaft having two spaced sprockets thereon, strips of negative and positive film movable by said sprockets in the same direction, a roller adjacent said positive sprocket, said positive film being turned over said roller, a tapered roller spaced from said first named roller, under which said positive film moves, and a second tapered roller spaced from the first tapered roller over which said positive film is drawn whereby the same is disposed opposite to said negative film and moved in the opposite direction thereof.

FREEMAN H. OWENS.